US008537467B2

(12) United States Patent
Ooe et al.

(10) Patent No.: US 8,537,467 B2
(45) Date of Patent: Sep. 17, 2013

(54) ANTIGLARE FILM, ANTIGLARE SHEET, PROCESS FOR PRODUCING THEM, AND IMAGE DISPLAY APPARATUS USING THEM

(75) Inventors: Naoto Ooe, Osaka (JP); Tatsuki Nagatsuka, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/337,869

(22) Filed: Dec. 27, 2011

(65) Prior Publication Data
US 2012/0099197 A1 Apr. 26, 2012

Related U.S. Application Data

(62) Division of application No. 12/443,568, filed as application No. PCT/JP2007/067699 on Sep. 12, 2007, now abandoned.

(30) Foreign Application Priority Data

Oct. 30, 2006 (JP) ................................ 2006-293503

(51) Int. Cl.
*G02B 13/20* (2006.01)
*G02B 5/02* (2006.01)
(52) U.S. Cl.
CPC .............. *G02B 5/0231* (2013.01); *G02B 5/021* (2013.01); *G02B 5/02* (2013.01)
USPC .......................................... 359/599; 359/831
(58) Field of Classification Search
USPC ............ 359/599, 601, 831–834, 487
See application file for complete search history.

(56) References Cited

U.S. PATENT DOCUMENTS

| 5,523,863 A | 6/1996 | Fergason |
| 5,575,549 A * | 11/1996 | Ishikawa et al. .............. 362/625 |
| 5,886,819 A | 3/1999 | Murata et al. |
| 6,123,431 A | 9/2000 | Teragaki et al. |

(Continued)

FOREIGN PATENT DOCUMENTS

| JP | 07-270604 A | 10/1995 |
| JP | 2003-004917 A | 1/2003 |

(Continued)

OTHER PUBLICATIONS

International Search Report mailed Dec. 4, 2007, Issued in corresponding International Patent Application No. PCT/JP2007/067699.

(Continued)

*Primary Examiner* — Thong Nguyen
(74) *Attorney, Agent, or Firm* — Westerman, Hattori, Daniels & Adrian, LLP

(57) ABSTRACT

An antiglare film and an antiglare sheet with which an image display apparatus excelling in contrast while maintaining excellent antiglare performance is obtained, and a simple process for producing them are provided. In the antiglare film of the present invention, a rugged shape in a first direction is substantially different from a rugged shape in a second direction perpendicular to the first direction. Preferably, an average gradient angle $\theta a_1$ of the rugged shape in the first direction is larger than an average gradient angle $\theta a_2$ of the rugged shape in the second direction. More preferably, a difference $\Delta\theta a = \theta a_1 - \theta a_2$ between the average gradient angle $\theta a_1$ and the average gradient angle $\theta a_2$ is 0.5° to 30°.

9 Claims, 4 Drawing Sheets

(56) References Cited

U.S. PATENT DOCUMENTS

| | | | |
|---|---|---|---|
| 6,861,121 B2 | 3/2005 | Matsunaga et al. | |
| 6,992,827 B2 | 1/2006 | Sakai et al. | |
| 7,106,517 B2* | 9/2006 | Olczak | 359/599 |
| 7,139,125 B1* | 11/2006 | Mi | 359/485.02 |
| 7,604,358 B2 | 10/2009 | Ninomiya et al. | |
| 7,662,483 B2 | 2/2010 | Horio et al. | |
| 7,675,682 B2* | 3/2010 | Lee et al. | 359/625 |
| 7,859,759 B2* | 12/2010 | Coyle et al. | 359/625 |
| 2005/0088746 A1* | 4/2005 | Yoshikawa et al. | 359/569 |
| 2006/0134429 A1 | 6/2006 | Horio et al. | |
| 2007/0195419 A1 | 8/2007 | Tsuda et al. | |
| 2007/0242475 A1 | 10/2007 | Minobe et al. | |
| 2007/0291367 A1 | 12/2007 | Hamamoto et al. | |
| 2008/0225201 A1* | 9/2008 | Hoshi | 349/62 |
| 2009/0233048 A1 | 9/2009 | Murata et al. | |
| 2011/0249337 A1* | 10/2011 | Ohashi et al. | 359/599 |

FOREIGN PATENT DOCUMENTS

| | | |
|---|---|---|
| JP | 2003-5661 A | 1/2003 |
| JP | 2003-167108 A | 6/2003 |
| JP | 2004-061966 A | 2/2004 |
| JP | 2005-352400 A | 12/2005 |
| JP | 3743624 B2 | 2/2006 |
| JP | 2006-293278 A | 10/2006 |
| JP | 2008-107756 A | 5/2008 |
| TW | 411320 B | 11/2000 |
| TW | 200606461 A | 2/2006 |

OTHER PUBLICATIONS

Taiwanese Office Action dated Feb. 22, 2012, issued in corresponding Taiwanese Patent Application No. 096136895, (With English Translation, 12 pages).

Japanese Office Action dated May 9, 2012, issued in corresponding Japanese Patent Application No. 2006-293503.

Japanese Office Action dated Jan. 30, 2013, issued in corresponding Japanese Patent Application No. 2006-293503.

* cited by examiner

Standard length L

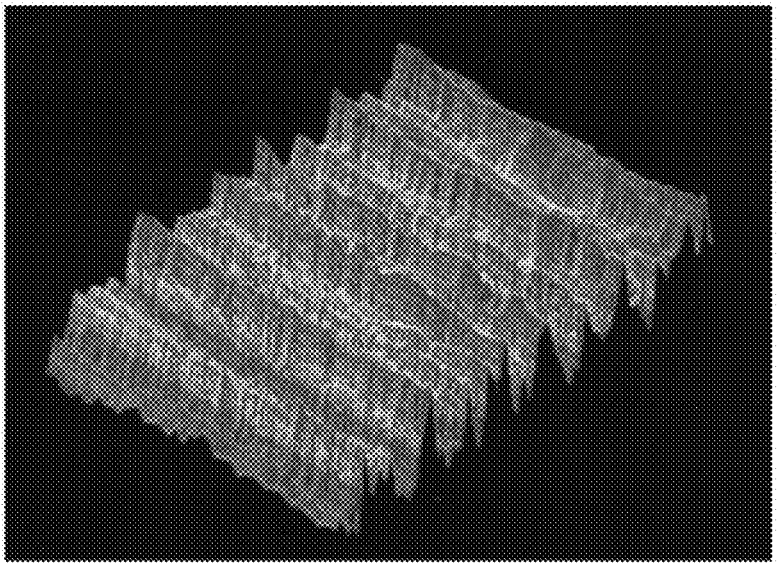

US 8,537,467 B2

ANTIGLARE FILM, ANTIGLARE SHEET, PROCESS FOR PRODUCING THEM, AND IMAGE DISPLAY APPARATUS USING THEM

CROSS-REFERENCE TO RELATED APPLICATIONS

This is a divisional application of U.S. patent application Ser. No. 12/443,568, filed on Mar. 30, 2009, now abandoned, which is a 371 of International Application No. PCT/JP2007/067699, filed on Sep. 12, 2007, which claims the benefit of priority from the prior Japanese Patent Application No. 2006-293503, filed on Oct. 30, 2006, the entire contents of which are incorporated herein by references.

TECHNICAL FIELD

The present invention relates to an antiglare film and an antiglare sheet. More specifically, the present invention relates to an antiglare film and an antiglare sheet that can provide an image display apparatus excelling in contrast while maintaining excellent antiglare performance. The present invention also relates to a simple process for producing the antiglare film and the antiglare sheet. Further, the present invention relates to an image display apparatus excelling in contrast with less so-called white blurring, using the antiglare film or the antiglare sheet.

BACKGROUND ART

In image display apparatuses such as a liquid crystal display (LCD) apparatus, an organic EL display apparatus, and a plasma display panel (PDP) apparatus, indoor illumination such as fluorescent light, sunlight incident through a window, a shadow of an operator/viewer, or the like is reflected on a display screen, which may impair the visibility of an image. In order to enhance the visibility of an image, for example, an LCD surface is provided with a light diffusing layer with a minute rugged structure. Such a light diffusing layer can diffuse surface reflected light and suppress the specular reflection of outdoor light, thereby suppressing reflections (that is, the light diffusing layer has antiglare performance).

As a method of forming such a light diffusing layer, a method of applying a resin with fine particles dispersed therein has been the mainstream because of the ease of formation of a fine structure and excellent productivity (see, for example, Patent Document 1). However, the entire surface of such a light diffusing layer diffuses and reflects light strongly, consequently, there arises a problem in that the contrast of a display screen is degraded due to so-called white blurring (phenomenon in which a display screen becomes whity during a black display).

Patent Document 1: JP 3743624 B

SUMMARY OF THE INVENTION

The present invention has been made for solving the conventional problems as described above, and an object of the present invention is to provide an antiglare film and an antiglare sheet with which an image display apparatus excelling in contrast while maintaining excellent antiglare performance is obtained, and a simple process for producing them.

An antiglare film of the present invention has a rugged shape in a first direction and a rugged shape in a second direction perpendicular to the first direction which are substantially different from each other.

In a preferred embodiment, an average gradient angle $\theta a_1$ of the rugged shape in the first direction is larger than an average gradient angle $\theta a_2$ of the rugged shape in the second direction. In a more preferred embodiment, a difference $\Delta \theta a = \theta a_1 - \theta a_2$ between the average gradient angle $\theta a_1$ and the average gradient angle $\theta a_2$ is 0.5° to 30°.

In a preferred embodiment, the average gradient angle $\theta a_1$ is 1° to 30°. In a preferred embodiment, the average gradient angle $\theta a_2$ is 0° to 5°. In a preferred embodiment, a thickness of the antiglare film is 2 μm to 50 μm.

In a preferred embodiment, the antiglare film is formed of a curable resin and subjected to embossment on a surface thereof. In a more preferred embodiment, the curable resin is at least one selected from an acrylic resin, a urethane-based resin, and an epoxy-based resin.

According to another aspect of the present invention, an antiglare sheet is provided. The antiglare sheet includes a base and the antiglare film placed on the base. In a preferred embodiment, the base contains a polyester-based resin.

According to still another aspect of the present invention, an optical laminate is provided. The optical laminate includes the antiglare film or the antiglare sheet, and a polarizer.

In a preferred embodiment, an angle formed by an absorption axis of the polarizer and the first direction in the antiglare film is substantially 45° or −45° in a clockwise direction. In another preferred embodiment, an absorption axis of the polarizer and the first direction are substantially parallel to each other.

According to still another aspect of the present invention, an image display apparatus is provided. The image display apparatus includes the antiglare film, the antiglare sheet, or the optical laminate.

In a preferred embodiment, the antiglare film, the antiglare sheet, or the optical laminate is placed so that the first direction corresponds to a horizontal direction of a display screen, and the second direction corresponds to a vertical direction of the display screen.

According to still another aspect of the present invention, a process for producing an antiglare film is provided. The process for producing an antiglare film includes applying and drying a solution of a curable resin to form a resin film; forming a predetermined rugged shape in a first direction of the resin film, and forming a rugged shape, which is different from the rugged shape in the first direction, in a second direction perpendicular to the first direction; and curing the resin film with the rugged shape formed thereon.

In a preferred embodiment, the rugged shape is formed by embossment.

EFFECTS OF THE INVENTION

According to the present invention, by allowing the rugged surface shape of an antiglare film to have anisotropy, there can be provided the antiglare film with which an image display apparatus excelling in contrast while maintaining excellent antiglare performance can be obtained. More specifically, in a conventional image display apparatus (for example, a flat panel display such as a liquid crystal display apparatus), a display screen specularly reflects outdoor light due to smoothness thereof, which causes a phenomenon of reflections. In contrast, when an antiglare film with an isotropic rugged surface is attached, although reflections can be prevented by diffused reflection, a white blurring phenomenon occurs inevitably due to the diffused reflection. According to the present invention, by adopting a rugged surface shape with particular anisotropy, the balance between the specular reflection and the diffused reflection can be kept appropriately (specifically, the rugged surface shape can subject outdoor light from above to specular reflection as a smooth surface, and can subject outdoor light from back and horizontal directions to diffused reflection appropriately). Consequently, reflections and white blurring, which have not been simultaneously prevented conventionally, can be prevented simultaneously.

BRIEF DESCRIPTION OF THE DRAWINGS

[FIG. 5] A laser micrograph of a surface shape of an antiglare film obtained in an example of the present invention.

DESCRIPTION OF SYMBOLS

| 10  | first direction |
| 20  | second direction |
| 100 | antiglare film |
| 110 | base |
| 200 | antiglare sheet |

BEST MODE FOR CARRYING OUT THE INVENTION

A. Antiglare Film

Figure 1:
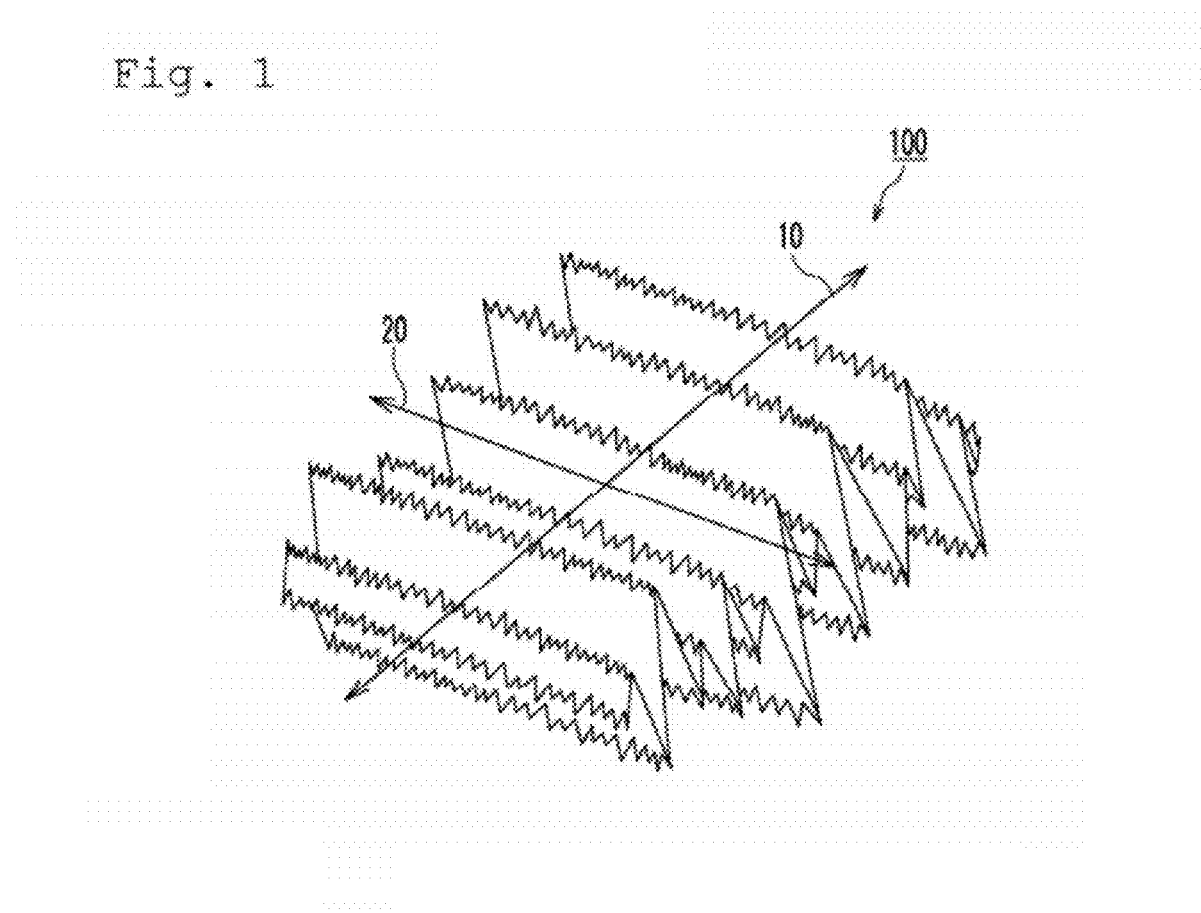
[FIG. 1] A schematic view illustrating a rugged surface shape of an antiglare film according to a preferred embodiment of the present invention.

An antiglare film of the present invention has a rugged surface shape with anisotropy. More specifically, as shown in FIG. 1, in an antiglare film 100 of the present invention, a rugged shape when viewed in a first direction 10 and a rugged shape when viewed in a second direction 20 perpendicular to the first direction are substantially different. Preferably, the surface roughness of the rugged shape when viewed in the first direction 10 is larger than the surface roughness of the rugged shape when viewed in the second direction 20. That is, the rugged shape when viewed in the first direction 10 has a statistical average distance between the mountain and the valley of the rugged shape larger than that when viewed in the second direction 20. FIG. 1 is a schematic view for allowing the rugged shape of the antiglare film of the present invention to be understood easily, and needless to say, an actual antiglare film may not have such an extreme rugged shape.

More preferably, an average gradient angle $\theta a_1$ of the rugged shape in the first direction 10 is larger than an average gradient angle $\theta a_2$ of the rugged shape in the second direction 20. More specifically, a difference $\Delta\theta a = \theta a_1 - \theta a_2$ between the average gradient angle $\theta a_1$ and the average gradient angle $\theta a_2$ is preferably 0.5° to 30°, more preferably 0.5° to 25°, particularly preferably 1° to 20°, and most preferably 1° to 7°. With such a relationship, white blurring and reflections can be prevented satisfactorily while antiglare performance is maintained. Note that $\theta a_1$ and $\theta a_2$ can be respectively increased or decreased appropriately by changing the level difference of the rugged shape per unit length in the first and second directions. For example, $\theta a_1$ can be increased by increasing the level difference of the rugged shape in the first direction, and $\theta a_1$ can be decreased by decreasing the level difference of the rugged shape in the first direction.

Figure 2:
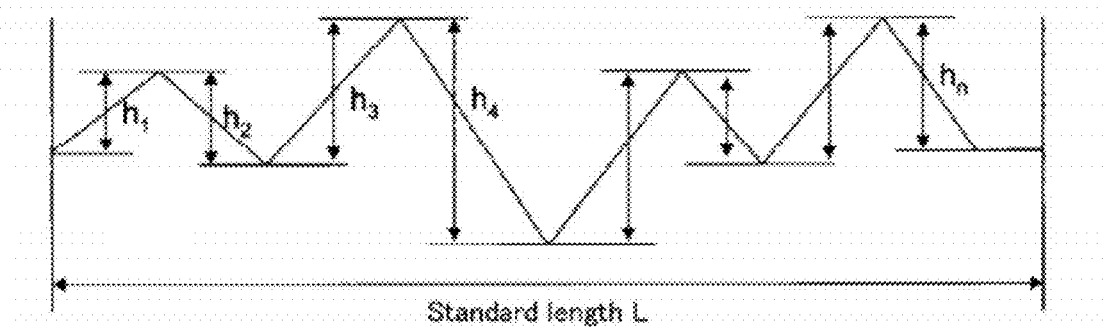
[FIG. 2] A schematic view illustrating a calculation method of an average gradient angle.

Herein, the "average gradient angle" refers to the average of the gradient of a straight line connecting the mountain to the valley of a surface roughness curve in a standard length. For example, as shown in FIG. 2, assuming that every height (distance between the mountain and the valley) at a standard length L is $h_1, h_2, h_3, h_4, \ldots h_n$, the average gradient angle $\theta a$ is represented by the following expression. In the antiglare film having a rugged surface shape with anisotropy according to the present invention, no strict correlation is found between the average gradient angle $\theta a$ and the surface roughness Ra. For example, in the case where the surface roughness $Ra_1$ in the first direction is larger than the surface roughness $Ra_2$ in the second direction, the average gradient angle $\theta a_1$ in the first direction is larger than the average gradient angle $\theta a_2$ in the second direction in many cases. The opposite case may occur. On the other hand, in a conventional antiglare film having isotropic (random) rugged shape, $\theta a_1$ and $\theta a_2$ are substantially equal, and $Ra_1$ and $Ra_2$ are substantially equal. It is one of the achievements of the present invention to have found the relationship between the average gradient angle in two directions, and the white blurring and reflections in an antiglare film with an isotropic rugged surface shape.

$$\theta a = \tan^{-1}\left(\frac{h_1 + h_2 + h_3 + h_4 + \ldots + h_n}{L}\right)$$ [Numerical Expression 1]

The average gradient angle $\theta a_1$ is preferably 1° to 30°, more preferably 2° to 27°, particularly preferably 3.5° to 15°, and most preferably 3.5° to 10°. Further, the average gradient angle $\theta a_2$ is preferably 0° to 5°, more preferably 0.1° to 3.5°, particularly preferably 0.1° to 2.5°, and most preferably 0.2° to 1.5°. By setting the average gradient angles $\theta a_1$ and $\theta a_2$ respectively in such ranges, the white blurring and reflections can be further prevented.

The thickness of the antiglare film of the present invention is preferably 2 μm to 50 μm, and more preferably 3 μm to 30 μm. If the thickness is in such ranges, a desired rugged shape can be formed, and the transparency and mechanical strength of the film also can be ensured.

As a material constituting the antiglare film of the present invention, any suitable material usable in an optical film can be adopted. Preferably, the antiglare film of the present invention is formed of a curable resin. Specific examples of the curable resin include an energy line curable resin and a thermosetting resin. Specific examples of the energy line include an electron beam and light (e.g., UV-light, visible light). When such a curable resin is used, the curable resin can be cured substantially completely after a desired rugged shape is formed, whereby the formed rugged shape can be solidified. Consequently, a film excellent in durability, retention, and stability of a rugged shape can be obtained. Specific examples of such a curable resin include an acrylic resin, a urethane-based resin, an epoxy-based resin, an acrylic urethane-based resin, a polyester-based resin, an amide-based resin, and a silicone-based resin. The acrylic resin, urethane-based resin, and epoxy-based resin are preferred. Those curable resins can be used alone or in combination. Those curable resins are generally available in a liquid composition form.

The curable resin (liquid composition) can further contain any suitable additives in accordance with the purpose. Specific examples of the additives include a surfactant, a plasticizer, an antioxidant, a conductivity providing material, a UV-absorber, a photostabilizer, a cross-linking agent, a cross-linking assistant, a polymerization initiator, and a thickener. By adjusting the kind and/or amount of the additives to be used, an antiglare film having desired properties can be obtained in accordance with the purpose.

The rugged shape of the antiglare film of the present invention is preferably formed by embossment. The method of forming a rugged shape will be described in detail in the item C described later.

B. Antiglare Sheet

Figure 3:
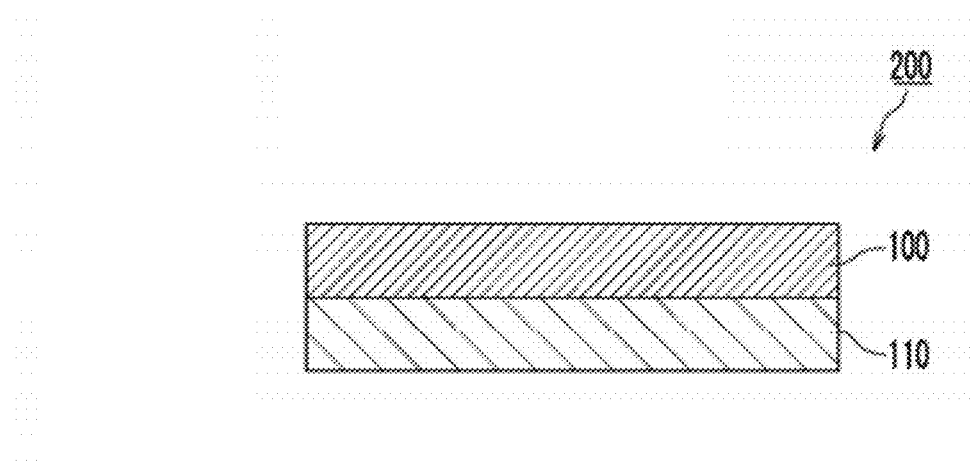
[FIG. 3] A schematic cross-sectional view of an antiglare sheet according to a preferred embodiment of the present invention.

FIG. 3 is a schematic cross-sectional view of an antiglare sheet according to a preferred embodiment of the present invention. An antiglare sheet 200 includes a base 110 and an antiglare film 100 placed on the base. The antiglare film is as described in the item A. In one embodiment, the base and the antiglare film are laminated directly (that is, via no adhesion layer).

The above base is typically formed of a film containing a resin which is transparent and small optical birefringence. Specific examples of the resin include: polyester-based resins such as polyethylene terephthalate, polyethylene naphthalate; cellulose-based resins such as diacetyl cellulose and triacetyl cellulose; polycarbonate-based resins; acrylic resins such as polymethyl methacrylate; styrene-based resins such as polystyrene and a acrylonitrile-styrene copolymer; olefin-based resins such as polyethylene, polypropylene, polyolefin having a cyclic or norbornene structure and an ethylene-propylene copolymer; vinyl chloride-based resin; amide-based resins such as nylon and aromatic polyamide; imide-based resins; sulfone-based resins; polyether sulfone-based resins; polyether ether ketone-based resins; polyphenylene sulfide-based resins; vinyl alcohol-based resins; vinylidene chloride-based resins; vinyl butyral-based resins; arylate-based resins; polyoxymethylene-based resins; epoxy-based resins; and blended products thereof. Preferred are polyester-based resins and particularly preferred is polyethylene terephthalate.

The thickness of the base is preferably 1 µm to 500 µm and more preferably 20 µm to 300 µm.

C. Process for Producing Antiglare Film and Antiglare Sheet

Figure 4:
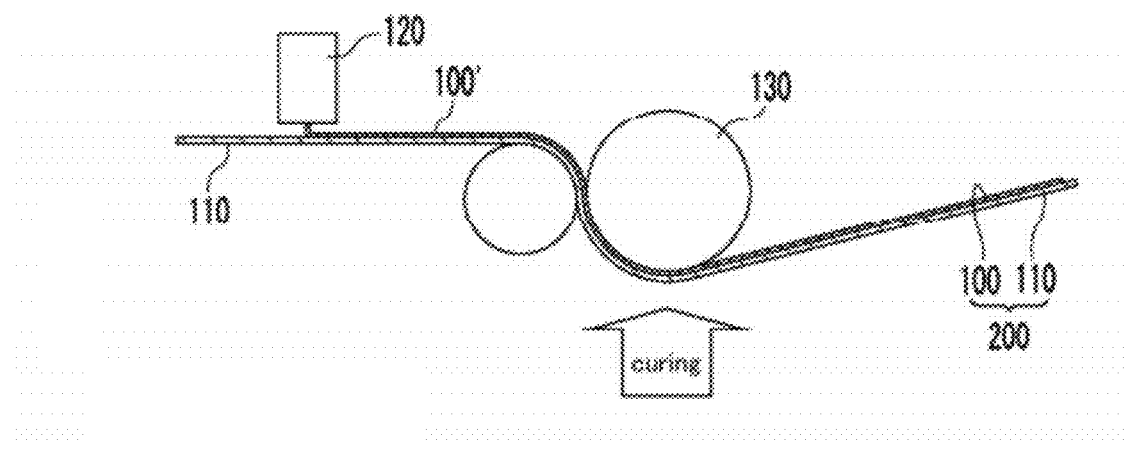
[FIG. 4] A schematic view illustrating a process for producing an antiglare film according a preferred embodiment of the present invention.

FIG. 4 is a schematic view illustrating a process for producing an antiglare film according to a preferred embodiment of the present invention. First, a solution of a curable resin is applied to the transported base 110 to form a coating layer (resin film) 100'. The curable resin is as described in the item A. The curable resin is generally available in a liquid composition form, and hence it can be applied directly. Alternatively, the curable resin may be applied after the viscosity thereof is adjusted by diluting the curable resin with a predetermined solvent or adding a thickener to the curable resin. By adjusting the viscosity, the coating thickness is adjusted, and as a result, the thickness of the antiglare sheet can be adjusted. If required, the flow of the coating layer may be prevented or suppressed by subjecting the curable resin after being applied to a predetermined heat treatment. The heating temperature and heating time can be adjusted appropriately depending upon the kind of the curable resin, the kind and content of the solvent, the viscosity of the coating liquid, the desired thickness, and the like. The coating layer can be formed directly on the base with no adhesion layer or the like. If required, the base may be subjected to a treatment (for example, a corona treatment, a flame treatment) for enhancing the adhesiveness between the base and the coating layer.

As the application method 120 of the curable resin solution, any appropriate method may be employed. Specific examples of the method include: coating methods such as an air doctor coating, a blade coating, a knife coating, a reverse coating, a transfer roll coating, a gravure roll coating, a kiss coating, a cast coating, a spray coating, a slot orifice coating, a calendar coating, an electrocoating, a dip coating, and a die coating; printing methods such as a letterpress printing such as aniline printing, a intaglio printing such as a direct gravure printing and an offset gravure printing, a litho printing such as an offset printing, and a stencil printing such as a screen printing.

Next, a predetermined rugged shape is formed in a first direction on the surface of the coating layer 100', and a rugged shape different from the rugged shape in the first direction is formed in a second direction perpendicular to the first direction. Such a rugged shape with anisotropy is preferably formed by embossment. More specifically, the embossment is performed by allowing a laminate of the base 110/coating layer 100' to be pressed with an emboss roll 130. By using the emboss roll, the following advantages are obtained: (1) a rugged shape with anisotropy, which has been substantially impossible to form according to a method of dispersing particles to form a rugged shape, can be formed; (2) films transported continuously are subjected to embossment, which can realize excellent productivity; (3) the reproducibility of a rugged shape is remarkably excellent, compared with the case of dispersing particles to form a rugged shape, and hence the variation in films can be prevented remarkably; and (4) it is only necessary to shape the surface of an emboss roll and transfer the shape to a film, and therefore, compared with the case of forming a rugged shape directly on a film, a rugged shape as designed can be formed on a film, and it is very easy to design such a rugged shape.

Next, the coating layer 100' with a rugged shaped formed on the surface is completely cured to form an antiglare film 100. The curing method and curing conditions can be appropriately selected depending upon the kind of the curable resin. For example, if the curable resin is an electron beam curable resin (for example, UV-curable resin), the curable resin may be irradiated with an electron beam (e.g., UV-light), and if the curable resin is a thermosetting resin, the curable resin may be heated. In the case of using the electron beam curable resin, the coating layer may be cured by being irradiated with an electron beam, and thereafter, may be heat-treated, if required, to evaporate a solvent.

As described above, the antiglare sheet 200 having the base 110 and the antiglare film 100 is obtained. In the case of using the antiglare film alone, the base may be peeled. In this case, the base may have been subjected to any suitable peeling treatment.

D. Optical Laminate

The optical laminate of the present invention includes the antiglare film or the antiglare sheet, and a polarizer. In one embodiment, the antiglare film or the antiglare sheet and the polarizer are laminated via an adhesion layer. Preferably, the optical laminate includes the antiglare film, the base, and the polarizer in the stated order. According to such an embodiment, the base also functions as a protective layer of the polarizer, thereby enhancing the durability of the polarizer. Further, in the case where the optical laminate is exposed to a high-temperature or low-temperature environment, a stress involved in the expansion or contraction of the polarizer is not transmitted directly to the antiglare film, and hence cracks can be prevented from being generated in the antiglare film.

As the polarizer, any suitable polarizer can be adopted. Specific examples include: a stretched film of a polymer film containing a polyvinyl alcohol-based resin as a main component, which contains iodine or a dichroic dye; an O-type polarizer in which a liquid crystalline composition containing a dichroic substance and a liquid crystalline compound is aligned in a constant direction, as disclosed in U.S. Pat. No. 5,523,863; and an E-type polarizer in which a lyotropic liquid crystal is aligned in a constant direction, as disclosed in U.S. Pat. No. 6,049,428. Preferably, the polarizer is the stretched film of a polymer film containing a polyvinyl alcohol-based resin as a main component, which contains iodine or a dichroic dye. This is because such a stretched film has a high polarization degree and can enhance a contrast ratio in a front direction of an image display apparatus. Such a polymer film is produced by a method described in, for example, JP 2001-315144 A [Example 1].

The transmittance (may also be referred to as single axis transmittance) of the polarizer at a wavelength of 440 nm measured at 23° C. is preferably 41% or more and more preferably 43% or more. Further, the polarization degree is preferably 99.8% or more, and more preferably 99.9% or more.

In the case where the polarizer is a stretched film of a polymer film containing a polyvinyl alcohol-based resin as a main component, the adhesion layer is preferably composed of a water-soluble adhesive. The water-soluble adhesive preferably contains a polyvinyl alcohol-based resin as a main component. The thickness of the adhesion layer is typically 0.1 μm to 50 μm, and preferably 1 μm to 30 μm. If the thickness of the adhesion layer is in the above ranges, an antiglare film and a polarizer can be bonded without floating and peeling, and an adhesive strength and an adhesion time without any adverse effects in terms of a practical use can be obtained.

In one embodiment, the absorption axis of the polarizer and the first direction of the antiglare film are substantially parallel to each other. Such an optical laminate is used particularly preferably in a normally black type liquid crystal display apparatus, and white blurring and reflections can be prevented satisfactorily. In another embodiment, an angle formed by the absorption axis of the polarizer and the first direction of the antiglare film is substantially 45° or −45° in a clockwise direction. Such an optical laminate is used particularly preferably in a normally white type liquid crystal display apparatus, and white blurring and reflections can be prevented satisfactorily.

E. Image Display Apparatus

The image display apparatus of the present invention includes the antiglare film, the antiglare sheet, or the optical laminate. Specific examples of the image display apparatus of the present invention include a liquid crystal display (LCD) apparatus, an organic EL display apparatus, a plasma display panel (PDP) apparatus, and a field emission display (FED). Particularly preferably, the image display apparatus of the present invention is an image display apparatus with a large screen (for example, a large liquid crystal television).

Preferably, the antiglare film, the antiglare sheet, or the optical laminate is placed so that a first direction (an arrow 10 in FIG. 1) in the antiglare film corresponds to the horizontal direction of a display screen, and a second direction (an arrow 20 in FIG. 1) corresponds to the vertical direction of the display screen. For example, the antiglare film is placed so that the first direction is substantially identical to the horizontal direction (horizontally long direction) of the screen of a stationary liquid crystal television. Due to such a configuration, white blurring can be particularly prevented remarkably.

Hereinafter, the present invention will be described specifically by way of examples; however, the present invention is not limited to those examples. An evaluation method in the examples will be described below.

(1) Average Gradient Angle θa:

The rugged surface of an antiglare film was measured in a length of 4 mm in a predetermined direction under conditions of a scanning speed of 0.1 mm/sec. and a cut-off value of 0.8 mm by a needle-contact surface roughness meter (High-precision micro figure measuring instrument Surfcoder ET4000, manufactured by Kosaka Laboratory Ltd.) having a measurement needle whose tip end made of diamond has a radius of curvature R of 2 μm, and an average gradient angle θa(°) was obtained from the surface roughness curve.

(2) Center Line Average Surface Roughness Ra:

A center line average surface roughness Ra was measured in accordance with JIS B0601-1994. Specifically, a glass plate (thickness: 1.3 mm) manufactured by Matsunami Ind. Ltd. was attached to a surface of the antiglare film opposite to the rugged surface with a pressure-sensitive adhesive to create a sample, and an Ra value of the sample was measured by High-precision micro figure measuring instrument Surfcoder ET4000, manufactured by Kosaka Laboratory Ltd.

(3) White Blurring:

(3-1) Visual Observation Evaluation:

A fluorescent light placed at an angle of about 50° with respect to a liquid crystal panel was lit, and the lightness (whiteness) when viewing the liquid crystal panel from a front surface was evaluated by visual observation in three stages. Specifically, the case where almost no whiteness was found on the panel was evaluated as ○; the case where a part of the panel became strong white or the case where a large part of the panel was whitish was evaluated as Δ; and the case where a large part of the panel was strong white was evaluated as ×.

(3-2) Front Brightness Evaluation:

A fluorescent light placed at an angle of about 50° with respect to a liquid crystal panel was lit to radiate 200 lux-light on the panel surface, and the brightness in a front direction was measured by a brightness meter (BM-5A, manufactured by Topcon Technohouse Corporation).

(4) Reflections:

A fluorescent light was placed in front of a liquid crystal panel and was lit, and the clearness of a contour of the fluorescent light reflected on the panel was evaluated by visual observation in three stages. The case where the contour of the fluorescent light was not recognized was evaluated as ○; the case where the contour was recognized although it was not clear was evaluated as Δ; and the case where the contour was recognized clearly was evaluated as ×.

(5) Observation of Surface Shape of Antiglare Film

The surface shape of the antiglare film was observed using a laser microscope (KEYENCE VK-8500 (monitor unit), VK-8510 (microscope body)).

Example 1

A UV-curable acrylic resin (Beam-set (product name), manufactured by Arakawa Chemical Industries, Ltd.) was applied to a polyethylene terephthalate (PET) film (Lumirror U34 (product name); thickness of 100 μm, manufactured by Toray Industries, Inc.) with a comma coater in a thickness of 10 μm, whereby a laminate of a PET base/acrylic resin coating layer was produced. Subsequently, the laminate was irradiated with UV-light from the PET base side while being pressed against a roll embossed in a predetermined surface shape to cure the coating layer, whereby an antiglare sheet having a configuration of a base/antiglare film was obtained. The irradiation strength of UV-light was 40 mW/cm$^2$, and the total irradiation amount of UV-light was 300 mJ/cm$^2$. Table 1 shows a surface roughness $Ra_1$ and an average gradient angle θa₁ in a first direction of the antiglare film of the obtained antiglare sheet, a surface roughness Ra₂ and an average gradient angle θa₂ in a second direction, and Δθ. Further, FIG. 5 shows a laser micrograph of the surface shape of the antiglare film.

The obtained antiglare sheet was attached to a liquid crystal panel taken out from a notebook computer (Wide 17 type, INSPIRON 630 m (Trade name), manufactured by Dell Computer Corporation). At this time, the antiglare sheet was attached to the liquid crystal panel so that the first direction of the antiglare film (herein, the direction in which the average gradient angle θa is larger) is substantially identical to the horizontal direction of a display screen, and the second direction (herein, the direction in which the average gradient angle θa is smaller) is substantially identical to the vertical direction of the display screen. The white blurring and reflections of the liquid crystal panel to which the antiglare film was attached were evaluated. Table 1 below shows the results.

TABLE 1

| | $\theta a_1$ (°) | $\theta a_2$ (°) | $\Delta\theta a$ (°) | $Ra_1$ (μm) | $Ra_2$ (μm) | White blurring Front brightness (Lx) | Reflections |
|---|---|---|---|---|---|---|---|
| Example 1 | 3.9 | 0.8 | 3.1 | 0.38 | 0.1 | ○ (0.08) | ○ |
| Example 2 | 3.9 | 3.2 | 0.7 | 0.37 | 0.70 | ○ (0.11) | ○ |
| Example 3 | 11.3 | 3.5 | 7.8 | 1.27 | 1.14 | ○ (0.10) | ○ |
| Example 4 | 26.4 | 2.0 | 24.4 | 1.78 | 0.71 | ○ (0.10) | ○ |
| Comparative example 1 | 0.8 | 0.8 | 0 | 0.10 | 0.10 | ○ (0.08) | Δ |
| Comparative example 2 | 3.9 | 3.9 | 0 | 0.37 | 0.37 | Δ (0.33) | ○ |
| Comparative example 3 | 0.8 | 3.9 | −3.1 | 0.1 | 0.38 | Δ (0.33) | Δ |
| Comparative example 4 | 2.0 | 26.4 | −24.4 | 0.71 | 1.78 | x (4.82) | ○ |
| Comparative example 5 | 3.5 | 11.3 | −7.8 | 1.15 | 1.27 | x (4.19) | ○ |

Example 2

An antiglare sheet was obtained in the same way as in Example 1, except for using an emboss roll having a different surface shape (i.e., except for obtaining different $Ra_1$, $\theta a_1$, $Ra_2$, $\theta a_2$, and $\Delta\theta$). White blurring and reflections were evaluated in the same way as in Example 1, except for using the antiglare sheet. Table 1 shows the results.

Example 3

An antiglare sheet was obtained in the same way as in Example 1, except for using an emboss roll having a different surface shape (i.e., except for obtaining different $Ra_1$, $\theta a_1$, $Ra_2$, $\theta a_2$, and $\Delta\theta$). White blurring and reflections were evaluated in the same way as in Example 1, except for using the antiglare sheet. Table 1 shows the results.

Example 4

An antiglare sheet was obtained in the same way as in Example 1, except for using an emboss roll having a different surface shape (i.e., except for obtaining different $Ra_1$, $\theta a_1$, $Ra_2$, $\theta a_2$, and $\Delta\theta$). White blurring and reflections were evaluated in the same way as in Example 1, except for using the antiglare sheet. Table 1 shows the results.

Comparative Example 1

A commercially available polarizing plate with an antiglare function (antiglare polarizing plate NPF-SEG-1425DUAG200, manufactured by Nitto Denko Corporation) was attached to the same liquid crystal panel as that in Example 1 in place of a viewer side polarizing plate, and white blurring and reflections were evaluated. Table 1 shows the results.

Comparative Example 2

A commercially available polarizing plate with an antiglare function (antiglare polarizing plate NPF-SEG-1425DUAGS1, manufactured by Nitto Denko Corporation) was attached to the same liquid crystal panel as that in Example 1 in place of a viewer side polarizing plate, and white blurring and reflections were evaluated. Table 1 shows the results.

Comparative Example 3

The same antiglare film as that in Example 1 was used. The antiglare film was attached to a liquid crystal panel in the same way as in Example 1, except that the first direction (direction in which the average gradient angle θa is larger) was allowed to be substantially identical to the vertical direction of a display screen, and the second direction (direction in which the average gradient angle θa is smaller) was allowed to be substantially identical to the horizontal direction of the display screen, and white blurring and reflections were evaluated. Table 1 shows the results.

Comparative Example 4

The same antiglare film as that in Example 3 was used. The antiglare film was attached to a liquid crystal panel in the same way as in Example 3, except that the first direction (direction in which the average gradient angle θa is larger) was allowed to be substantially identical to the vertical direction of a display screen, and the second direction (direction in which the average gradient angle θa is smaller) was allowed to be substantially identical to the horizontal direction of the display screen, and white blurring and reflections were evaluated. Table 1 shows the results.

Comparative Example 5

The same antiglare film as that in Example 4 was used. The antiglare film was attached to a liquid crystal panel in the same way as in Example 4, except that the first direction (direction in which the average gradient angle θa is larger) was allowed to be substantially identical to the vertical direction of a display screen, and the second direction (direction in which the average gradient angle θa is smaller) was allowed to be substantially identical to the horizontal direction of the display screen, and white blurring and reflections were evaluated. Table 1 shows the results.

As is apparent from the comparison between Examples 1 to 4 and Comparative Examples 1 to 2, the antiglare sheet of the examples according to the present invention can simultaneously prevent both reflections and white blurring. As is apparent from Comparative Examples 3 to 5, the antiglare sheet of the present invention is attached to an image display apparatus in a particular positional relationship, whereby white blurring and reflections (in particular, white blurring) can be prevented remarkably.

INDUSTRIAL APPLICABILITY

The antiglare film, the antiglare sheet, and the optical laminate of the present invention can be respectively used preferably in various kinds of image display apparatuses (for example, a liquid crystal display apparatus, a self-emitting type display apparatus). Specific examples of applicable image display apparatuses include a liquid crystal display (LCD) apparatus, an organic EL display apparatus, a plasma display panel (PDP) apparatus, and a field emission display (FED).

What is claimed is:

1. An image display apparatus, comprising an optical laminate including an antiglare film and a polarizer on its display screen, wherein
   the antiglare film has a rugged shape in a first direction and a rugged shape in a second direction perpendicular to the first direction which are substantially different from each other, and an average gradient angle ($\theta a_1$) of the rugged shape in the first direction is larger than an average gradient angle ($\theta a_2$) of the rugged shape in the second direction;
   a direction of absorption axis of the polarizer and the first direction of the antiglare film are substantially parallel to each other or form an angle of 45° or −45° in a clockwise direction; and
   the optical laminate is placed so that the first direction corresponds to a horizontal direction of the display screen, and the second direction corresponds to a vertical direction of the display screen, and
   wherein the rugged shape in the first direction has different heights in the first direction, and the rugged shape in the second direction has different heights in the second direction.

2. An image display apparatus according to claim 1, wherein a difference $\Delta\theta a = \theta a_1 - \theta a_2$ between the average gradient angle ($\theta a_1$) and the average gradient angle ($\theta a_2$) is 0.5° to 30°.

3. An image display apparatus according to claim 1, wherein the average gradient angle ($\theta a_1$) is 1° to 30°.

4. An image display apparatus according to claim 1, wherein the average gradient angle ($\theta a_2$) is 0° to 5°.

5. An image display apparatus according to claim 1, wherein the antiglare film has a thickness of 2 μm to 50 μm.

6. An image display apparatus according to claim 1, wherein the antiglare film is formed of a curable resin and subjected to embossment on a surface thereof.

7. An image display apparatus according to claim 6, wherein the curable resin is at least one selected from an acrylic resin, a urethane-based resin, and an epoxy-based resin.

8. An image display apparatus according to claim 1, wherein the optical laminate further comprises a base.

9. An image display apparatus according to claim 8, wherein the base contains a polyester-based resin.

* * * * *